United States Patent [19]

Rudgard

[11] 4,445,115

[45] Apr. 24, 1984

[54] DISPLAY CONTROL UNIT HAVING MEANS FOR SYMBOLIC REPRESENTATION OF GRAPHICAL SYMBOLS

[75] Inventor: Ingemar Rudgard, Västeras, Sweden

[73] Assignee: ASEA Aktiebolag, Västeras, Sweden

[21] Appl. No.: 301,256

[22] Filed: Sep. 11, 1981

[30] Foreign Application Priority Data

Sep. 29, 1980 [SE] Sweden .............................. 8006799

[51] Int. Cl.³ .............................................. G09G 1/16
[52] U.S. Cl. .................................... 340/745; 340/728; 340/750; 340/721
[58] Field of Search ............... 340/728, 721, 745, 723, 340/731, 744, 750, 748

[56] References Cited

U.S. PATENT DOCUMENTS 3,967,268  6/1976  Roberts .............................. 340/745
4,242,678  12/1980  Somerville ......................... 340/728

Primary Examiner—Marshall M. Curtis

Attorney, Agent, or Firm—Pollock, Vande Sande & Priddy

[57] ABSTRACT

A display member, for example a visual display unit presents symbols which are divided into modules. Each module consists of a dot matrix. A refresh memory has one word for each module on the visual display unit. Out of the words in the refresh memory, which correspond to the modules of a symbol, one word contains a symbol code and the other words define the dot matrices of the modules. Control information in each word indicates if the word is a symbol code or a dot matrix. A code transformation memory is supplied with the symbol code and has a word at an address indicated by the symbol code, which word defines the dot matrix of the module in question. A selector forwards to the display member, in dependence on the control information, the word read from the refresh memory if the control information indicates that the word defines a dot matrix, and forwards the word read out from the code transformation memory if the control information indicates that the word read out from the refresh memory is a symbol code.

3 Claims, 8 Drawing Figures

FIG. 3a

| | 1 | 2 | 3 |
|---|---|---|---|
| | 4 | 5 | 6 |
| | 7 | 8 | 9 |

Bit no. 10 9 8 7 6 5 4 3 2 1 0

| 1 | - | | | | | | | | | |

FIG. 3b

Bit no. 10 9 8 7 6 5 4 3 2 1 0

| 0 | | | | | | | | | | |

| | 10 | 9 | 8 | 7 | 6 | 5 | 4 | 3 | 2 | 1 | 0 |
|---|---|---|---|---|---|---|---|---|---|---|---|
| N | 1 | - | 0 | 0 | 0 | 0 | 1 | 1 | 1 | 0 | 0 |
| N+1 | 1 | - | 0 | 0 | 0 | 1 | 0 | 0 | 0 | 1 | 0 |
| N+M | 0 | 0 | 0 | 0 | 1 | 0 | 0 | 0 | 0 | 0 | 1 |
| N+M+1 | 1 | - | 1 | 1 | 0 | 0 | 1 | 0 | 0 | 1 | 0 |

FIG. 4a

KTM

| 041 | 1 | 1 | 1 | 1 | 0 | 0 | 1 | 0 | 0 |

FIG. 4b

DISPLAY CONTROL UNIT HAVING MEANS FOR SYMBOLIC REPRESENTATION OF GRAPHICAL SYMBOLS

TECHNICAL FIELD

The present invention relates to a control unit for a display member, for example a visual display unit (VDU), which is arranged to present information in the form of a dot pattern, the information comprising predetermined symbols and being divided into modules in which each module consists of a dot matrix, the control unit comprising memory members, where information about the dot matrices of the modules is stored, as well as members for successive reading of the contents of the refresh memory to the display member.

The display member may primarily consist of a VDU (a cathode-ray tube of TV type or a plasma display), but also, for example, of a printer or typewriter, which generates a presentation in the form of a dot pattern on a permanent record medium (e.g. paper).

DISCUSSION OF PRIOR ART

A control unit of the above kind is previously known, for example from U.S. Pat. No. 4,131,883 issued Dec. 26th 1978. This known control unit has a regenerative memory or refresh memory (the latter designation being used in the following specification). For the characters or symbols which are to be presented the codes of the characters are stored in the memory in the form of digital words, for example at a position in the memory which corresponds to the position of the symbol in the VDU. When the presentation is to be written, which in the case of a VDU is done, for example, 50 times per second, the contents of the refresh memory are read out successively word by word. Each time a word, that is a symbol code, is read out, the code is further fed to a character generator. At an address determined by the symbol code, said character generator contains information about the dot matrix of the symbol. When a certain symbol code is supplied to the character generator, it delivers to the display member the stored information about the dot matrix of the symbol, and the symbol is presented, for example, on the VDU.

A considerable disadvantage of this known control unit is that one is forced to use a certain shape and size of the element of the VDU (or corresponding device) in which each symbol is written. This involves an often unacceptable limitation in those cases where it is desired to use symbols of different shape and size.

A solution which avoids the above-mentioned limitation is one of storing the dot matrix of the symbol directly in the refresh memory and omitting the character generator. In that case the dot matrix for a module of a certain uniform size is stored in each address of the refresh memory. Each module may, for example, consist of a row of dots which indicate the part of the symbol constituted by the module. Each module may consist of an arbitrary number of modules and may therefore be given arbitrary size and shape. The modules are written (for example on the VDU) row by row, and the words in the refresh memory which together define a symbol extending over several rows (which is normally the case) are therefore stored at a plurality of addresses in the memory.

Also this latter solution has several drawbacks. The refresh memory becomes large, since the whole dot matrices of the symbols (and not only a symbol code) have to be stored in the memory. Further, it takes a long time to write a symbol into the memory, since each dot in the character has to be separately written in.

However, the most important disadvantage is that it is difficult to read out the contents of the VDU from the contents of the refresh memory, that is, to read out what symbols are written on the VDU and where on the VDU they are placed. Normally, a display unit of the kind referred to cooperates with a computer, and the computer must then be able to read out of the current contents of the VDU. In a control unit according to said U.S. Pat. No. 4,131,883 this is a simple operation, since the codes of the symbols are stored in the refresh memory in successive order along the write direction. In a control unit in which the dot matrices of the symbols are stored directly in the refresh memory, it is difficult, or impossible in practice, to read out the contents of the image from the refresh memory.

STATEMENT OF INVENTION

The invention aims to provide a control unit of the kind defined in the introduction to this specification which makes possible a free choice of format (size and shape) of the symbols while at the same time permitting the contents of the image to be simply rad out from the refresh memory.

A control unit accordingly to the invention is characterised in that it comprises a refresh memory, each address of which corresponds to a module and where each address contains, on the one hand, either the dot matrix of a module or a symbol code and, on the other hand, control information which indicates if the contents (or word) at any particular address is the dot matrix of a module or a symbol code, a code transformation memory arranged to be supplied with the information read out from the refresh memory and to translate each symbol code into a respective dot matrix, and a selector arranged to be supplied with the information read out from the refresh memory and the code transformation memory and, upon reading a word from the refresh memory, in dependence on the control information, to select and forward to the display member the dot matrix from the refresh memory if the control information indicates that the read-out word contains a dot matrix, and the dot matrix from the code transformation memory, if the control information indicates that the read-out word is a symbol code.

BRIEF DESCRIPTION OF DRAWINGS

The invention will now be described, by way of example, with reference to the accompanying drawings, in which:

FIG. 3a shows the construction of one module, FIG. 3b shows how the dot matrix of one module is stored in the refresh memory, FIG. 3c shows how the code of a symbol is stored in the refresh memory, FIG. 4a shows how the symbol according to FIG. 2 is stored in the refresh memory, and FIG. 4b shows the code stored in the transformation memory.

DESCRIPTION OF SPECIFIC EMBODIMENTS

Figure 1A:
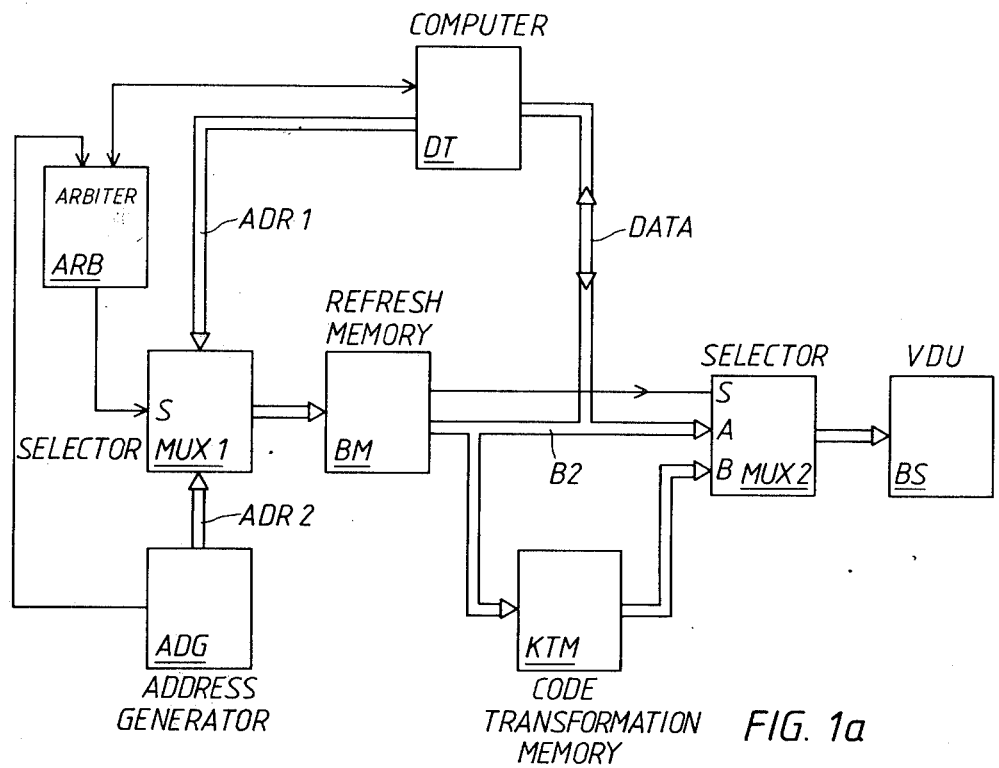
FIG. 1a shows schematically one example of a control unit according to the invention.

FIG. 1a is a block diagram of one embodiment of control unit according to the invention and its connection to a VDU (BS) and a computer (DT) for reading out the contents of the image and for writing in symbols and other information, for example graphic information, into the image. The control unit proper comprises a refresh memory (BM), a code transformation memory (KTM) and a selector (multiplexer) (MUX2). The VDU (BS) consists of a VDU of TV type with conventional built-in circuits for converting supplied digital information into video signals. In the refresh memory BM each module of a symbol is allocated a word (i.e. a certain address) in the memory. The modules are arranged in the memory BM in the order in which they are written on the VDU, that is, two modules written immediately after each other are written into consecutive addresses in the refresh memory. Each symbol may be built up of an arbitrary number of modules, in which each module has a predetermined shape and size, for example 3×3 dots on the VDU. Of the words in the refresh memory which correspond to the modules which are included in a symbol, one word constitutes the symbol code, that is, a digital word which defines the symbol in an unambiguous way. The other words constitute dot matrices for the modules to which the words correspond. Each word in the refresh memory contains a control bit, that is, a binary digit which may be either 0 or 1 and which indicates if the word is a symbol code (control bit=0), or the dot matrix of a module (control bit=1).

In the case of unchanged image, the refresh memory is addressed by an address generator ADG. This consists of a counter which periodically, for example 50 times per second, traverses all the addresses in the refresh memory, the contents of the refresh memory then being read out word by word and being supplied to the code transformation memory KTM as well as to the selector MUX2. The refresh memory may also be addressed from the computer DT when reading out the image contents to the computer or when writing new symbols into the refresh memory from the computer. In dependence on a control signal supplied to an input S of the selector MUX1 from a resource distributor (arbiter) ARB, the selector MUX1 chooses if the addressing is to be made from the address generator ADG or from the computer DT. The arbiter ARB makes the refresh memory BM, which is synchronized with the read and write cycles of the memory BM, available to either the computer DT or the address generator ADG.

The control bit in each word read out from the refresh memory BM, is supplied to a control input S of the selector MUX2. If the control bit is 0, the selector forwards the information from one of its inputs B and if the control bit is 1 it forwards the information from the other of its inputs A to the VDU (BS).

The code transformation memory KTM has a number of addresses. Each address corresponds to a symbol code, and at that address there is stored a word which constitutes the dot matrix of the module in the symbol for which, in the refresh memory BM instead of the dot matrix, the code of the symbol is stored.

When reading out the refresh memory BM, the refresh memory is traversed word by word. If the control bit for the read-out word is 1, the word constitutes the dot matrix of a module, which dot matrix is forwarded by the selector MUX2 to the VDU where the module is written. If the control bit for the read-out word is 0, the word constitutes a symbol code. The code constitutes the address to the word in the code transformation memory KTM where the dot matrix of the module in question is stored. This word is read out from the code transformation memory and is forwarded, via the selector MUX2, to the VDU, where the module is written.

The computer DT is able to read, in a simple manner, the contents of the image by addressing through the refresh memory BM and recording the words read, the control bits of which are 0. The words thus read are symbol codes for the symbols written on the VDU and identify these symbols in an unambiguous manner. The module, whose words in the refresh memory contain the symbol code, is suitably selected in a specified way, for example by way of the lowermost lefthand module in each symbol. In this way, when reading out the refresh memory BM, the computer DT is also given clear information about the location of each symbol on the image.

Figure 1B:
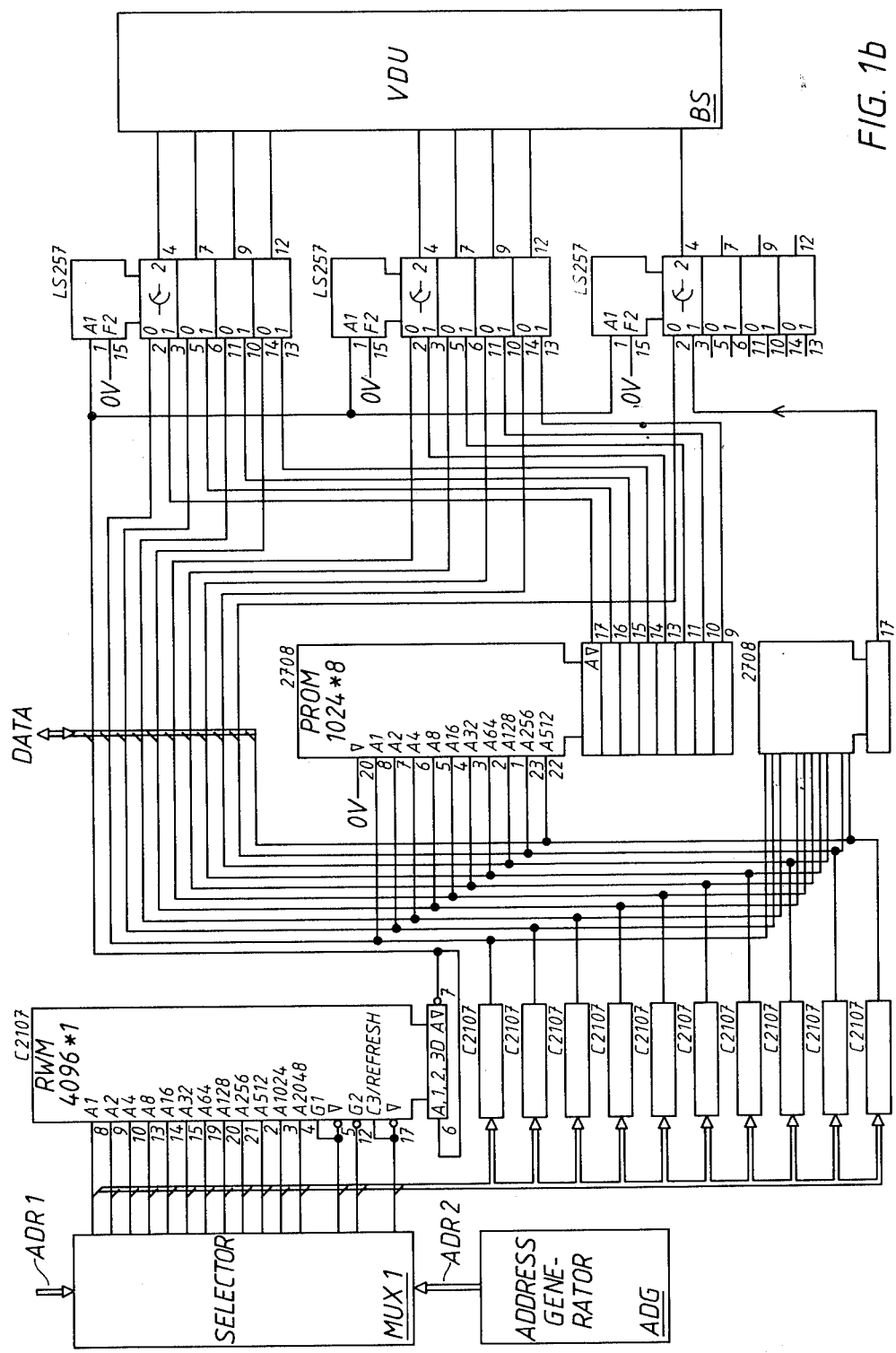
FIG. 1b is the control unit of FIG. 1a shown in greater detail, FIG. 2 gives one example of the division of a symbol into modules.

FIG. 1b shows in detail one example of how the control unit according to FIG. 1a may be designed in practice. The refresh memory BM consists of eleven writable and readable memory circuits (RWM) of type C2107. Only the uppermost of these RWM circuits is shown in detail in FIG. 1b with designations for the inputs and outputs and the pin numbers. The address obtained from the selector MUX1 is fed to the address inputs (A1–A2048). The other three inputs (G1, G2, C3) control the reading from and the writing into the respective part of the refresh memory. The connection at pin 6 is an input for writing in data and the connection at pin 7 is a negated output for reading from the memory. Each of the eleven RWM memory circuits stores one of the bits in each word in the memory. The uppermost circuit stores the bit 10 of the word, the control bit, and the other ten circuits each store one of the other 10 bits.

The pins 6 and 7 are connected to the computer, to the code transformation memory (the two circuits 2708), and to the selector MUX2 (the three circuits LS257). The connection of these constitutes the data bus B2 in FIG. 1a. As is clear from FIG. 4a, one of the bits is blank (unused) when the word contains a dot matrix and is only used when the word constitutes a symbol code. One of the RWM circuits C2107 (the lowermost in FIG. 1b) is therefore connected only to the code transformation memory and the computer, but not to the selector MUX2.

The code transformation memory consists of two programmable, readable memory circuits (PROM) designated 2708. To the ten address inputs (A1–A512) there is fed the current symbol code from the refresh memory, and from each of the eight outputs (pins 9–17) there is fed a bit in the word which constitutes the current dot matrix. Since the upper circuit has eight outputs it stores eight of the nine bits in the word. The ninth bit is obtained from pin 17 of the lower 2708 circuit.

The selector MUX2 consists of three selector circuits designated 74LS257 (LS257 in FIG. 1b). To the control input A1 on each circuit is fed the control bit which is obtained from the uppermost of the circuits C2107 in the refresh memory. Each circuit has four parts, each of which is responsible for one bit. Each part has two inputs (e.g. pins 2 and 3) and one output (pin 4). If the signal to the control input is 0, the input signal is forwarded on the input designated 0 to the output, and if the signal to the control input is 1, the signal is forwarded on the input designated 1. Each word which contains a dot matrix contains nine bits which define the matrix. In the lowermost of the circuits LS257, therefore, only the uppermost bit is used (pins 2, 3, 4).

As is also shown in FIG. 1a, the refresh memory may be addressed optionally by the address generator ADG (ADR2) or by the computer (ADR1) with the aid of the selector MUX1.

The output signal from the circuits LS257 is supplied to the VDU (BS), as is also shown in FIG. 1a.

Figure 2:
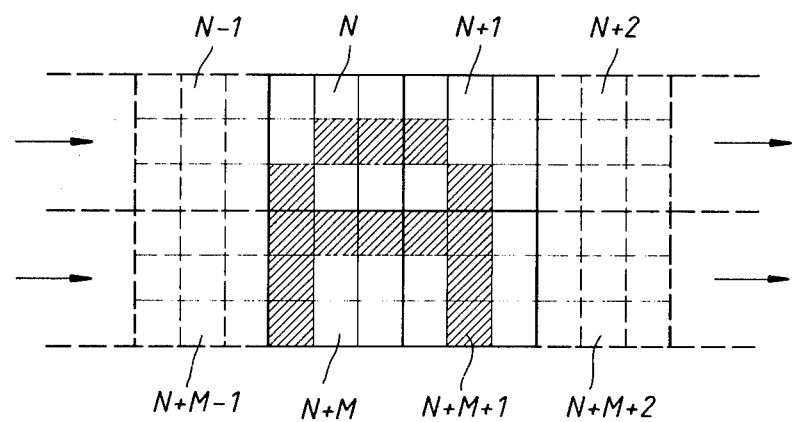

FIG. 2 shows how a symbol, in this case the letter A, may be built up of four modules designated N, N+1, N+M, N+M+1. Each module consists of 3×3 dots. For each dot the electron beam of the VDU may be effective to illuminate the screen surface or not (a dashed square corresponds to a dot where the screen is illuminated). The modules are written row by row and one by one from left to right (the write direction is shown by the arrows in FIG. 2) as the refresh memory is successively read out, and the designations of the modules in FIG. 2 are the same as the address of the corresponding word in the refresh memory. Each row on the VDU is assumed to contain M modules, and the module which is positioned, for example, directly below the module N is therefore given the address N+M.

FIG. 3a shows one module and how its nine dots may be numbered. FIG. 3b shows a word in the refresh memory which constitutes the dot matrix of a module. Bit 10 in the word, the control bit, is 1, the next bit 9 is not used, and the following nine bits (8-0) indicate, in successive order, if the appropriate screen area of the VDU is to be illuminated (1) or not (0) in the corresponding dot. FIG. 3c shows a word in the refresh memory in which a symbol code is stored. Bit 10, the control bit, is therefore 0, and the following nine bits (9-0) constitute the symbol code.

FIG. 4a shows the four words in the refresh memory which correspond to the four modules in the letter A shown in FIG. 2. The words with the addresses N, N+1 and N+M+1 each have the control bits 1, which indicates that the words contain the dot matrices of the modules. The words are therefore forwarded via the selector MUX2 directly to the VDU, where the modules are written. The word N+M, on the other hand, has the control bit 0, which indicates that the word constitutes a symbol code. The word (041 expressed in hexadecimal notation) is thus the chosen symbol code for A and is at the same time the address in the code transformation memory to the word, where the dot matrix for the corresponding module of the symbol is stored (see FIG. 4b). When the word N+M is read out from the refresh memory, the word in the code transformation memory which has the address $041_{HEX}$ is therefore read out and this word is forwarded via the selector MUX2 to the VDU.

When the computer is to read out the contents of the image from the refresh memory BM, it need only read the words whose control bits are 9. These words contain symbol codes which define which symbols are to be found on the VDU, and the addresses of the words indicate the position of the symbols on the VDU.

The concept "symbols" as used in the above description should be taken to include, inter alia, letters, numbers, mathematical signs and designations, electric, hydraulic and pneumatic circuit diagram symbols.

In addition to symbols, the image contents may also comprise other information, for example graphic information (curves, diagrams, and the like)

What is claimed is:

1. A control unit for a display member which presents information in the form of a dot pattern, the information comprising predetermined symbols and being divided into modules, each of which consists of a dot matrix, the control unit comprising:
    a refresh memory, each address of which corresponds to a module and where each address contains either the dot matrix of a module or a symbol code and control information which indicates if the contents at any particular address is the dot matrix of a module or a symbol code,
    a code transformation memory connected to be supplied with the information read out from the refresh memory and to translate each symbol code into a respective dot matrix, and
    a selector connected to be supplied with the information read out from the refresh memory and the code transformation memory and in response to said control information to select and forward to the display member the dot matrix from the refresh memory if the control information indicates that the read-out word contains a dot matrix, and the dot matrix from the code transformation memory, if the control information indicates that the read-out word is a symbol code.

2. A control unit according to claim 1, in which a specified bit in each word in the refresh memory comprises the control information.

3. A control unit according to claim 1, in which one of the words, which in the refresh memory correspond to the modules of a symbol, contains the symbol code of the symbol, and the remaining words contain the dot matrices of the modules.

* * * * *